(12) United States Patent
Yang

(10) Patent No.: US 8,522,811 B2
(45) Date of Patent: Sep. 3, 2013

(54) AUTO FLOW STEAM TRAP

(76) Inventor: Yung-Sho Yang, New Taipei (TW)

( * ) Notice: Subject to any disclaimer, the term of this patent is extended or adjusted under 35 U.S.C. 154(b) by 197 days.

(21) Appl. No.: 13/217,657

(22) Filed: Aug. 25, 2011

(65) Prior Publication Data

US 2013/0048105 A1  Feb. 28, 2013

(51) Int. Cl.
*F16T 1/20* (2006.01)

(52) U.S. Cl.
USPC ........... 137/194; 137/192; 137/264; 137/397; 137/549

(58) Field of Classification Search
USPC ................ 137/177, 181, 183, 187, 192, 194, 137/203, 204, 397, 398, 409, 429, 544, 549
See application file for complete search history.

(56) References Cited

U.S. PATENT DOCUMENTS

| | | | | |
|---|---|---|---|---|
| 914,418 A | * | 3/1909 | Hutchins | 137/176 |
| 1,738,809 A | * | 12/1929 | Walter | 137/179 |
| 4,276,354 A | * | 6/1981 | Winiasz | 428/582 |
| 4,708,157 A | * | 11/1987 | Sabatino | 137/179 |
| 7,571,739 B2 | * | 8/2009 | Stamatakis et al. | 137/192 |

* cited by examiner

*Primary Examiner* — Craig Schneider
*Assistant Examiner* — Ian P Aquette
(74) *Attorney, Agent, or Firm* — Ditthavong Mori & Steiner, P.C.

(57) ABSTRACT

An auto flow steam trap has a hollow body, a partition panel mounted in the body, at least one float seat mounted on the partition panel and at least one float assembly mounted in the at least one float seat. Condensate flows through at least one condensate inlet formed on the body, the at least one float seat and at least one float assembly, and then is drained out of the steam trap from a transverse outlet formed on the body. No flash steam occurs when the condensate is drained out of the steam trap. With a non-return valve assembly of the float seat, the condensate and steam that have flowed out of the steam trap do not flow back into the steam trap so a float of the float assembly is not damaged.

20 Claims, 10 Drawing Sheets

AUTO FLOW STEAM TRAP

BACKGROUND OF THE INVENTION

1. Field of the Invention

The present invention relates to an auto flow steam trap, especially to a steam trap that discharges condensate formed in a steam system.

2. Description of the Prior Art(s)

In a steam system, such as a steam pipeline, a steam container, a steam heater and the like, when the temperature of steam with high temperature and high pressure is lowered, condensate is formed in the steam system. A steam trap that is connected to the steam system discharges the condensate in the steam system and maintains heating effect of the steam system.

With reference to FIG. 10, a conventional ball float steam trap 60 comprises a hollow housing 61 and a ball float 62. The housing 61 has a collecting chamber 611 and a drain chamber 612. The collecting chamber 611 is defined in the housing 61 and communicates with a steam system 70. The drain chamber 612 is defined in the housing 61, communicates with the collecting chamber 611 via an outlet 613 formed at a bottom of the housing 61 and via a drain channel 614 formed at a top of the housing 61, and communicates with a water collecting tank. The ball float 62 is mounted in the collecting chamber 611 and selectively seals the outlet 613.

When no condensate is accumulated in the collecting chamber 611, the ball float 62 seals the outlet 613. When the condensate is gradually accumulated in the collecting chamber 611, the condensate raises the ball float 62 to open the outlet 613 so the condensate in the collecting chamber 611 further flows into the drain chamber 612 and the water collecting tank However, the conventional steam trap 60 has the following disadvantages. Since the ball float 62 is not supported or led by any other structure in the housing 61, the ball float 62 is easily displaced and does not seal the outlet 613 accurately. Furthermore, normally, the collecting chamber 611 communicates to the drain chamber 612 through the drain channel 614. Thus, the high temperature steam in the steam system 70 leaks to outside of the conventional steam trap through the outlet 613 that is not accurately sealed and the drain channel 614. Consequently, thermal energy of the steam system 70 is wasted and the heating effect of the steam system 70 is low.

Moreover, once the condensate flows into the collecting chamber 611, the ball float 62 is raised and the condensate is drained immediately. Therefore, when the condensate still with high temperature is drained to the outside of the conventional steam trap, pressure and temperature of the condensate drop suddenly so dangerous flash steam and water hammer occur and the thermal energy of the steam system 70 is also wasted.

To overcome the shortcomings, the present invention provides an auto flow steam trap to mitigate or obviate the aforementioned problems.

SUMMARY OF THE INVENTION

The main objective of the present invention is to provide an auto flow steam trap. The steam trap has a hollow body, a partition panel mounted in the body, at least one float seat mounted on the partition panel and at least one float assembly mounted in the at least one float seat. The body is divided into an upper chamber, a lower chamber and a drain channel.

Condensate flows through at least one condensate inlet formed on the body, is accumulated in the upper chamber, flows through the at least one float seat and at least one float assembly and into the lower chamber, and then is drained out of the steam trap from a transverse outlet formed on the body. Thus, no flash steam occurs when the condensate is drained out of the steam trap. With a non-return valve assembly of the float seat, the condensate and steam that have flowed out of the steam trap do not flow back into the steam trap so a float of the float assembly is not damaged.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
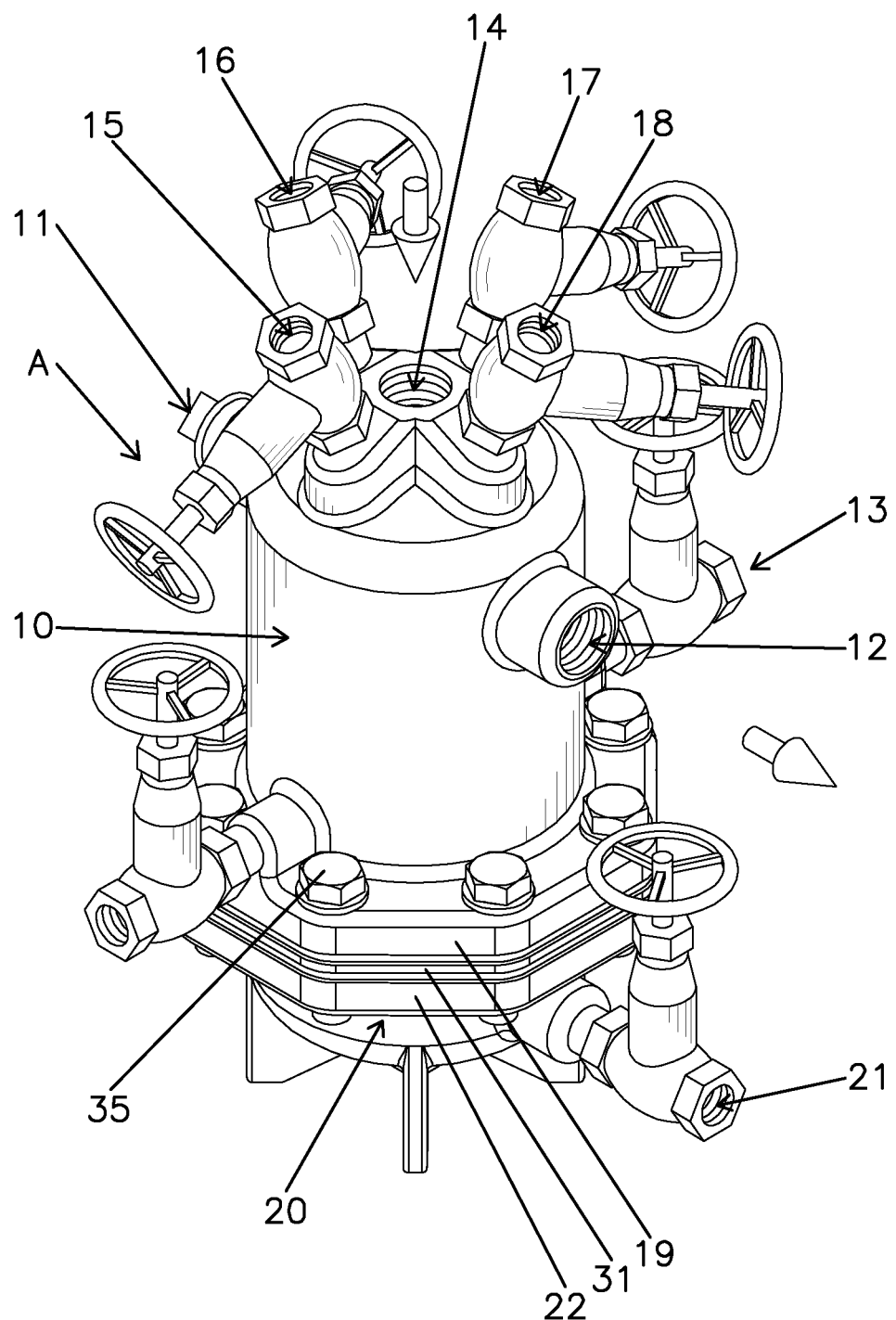
FIG. 1 is a perspective view of a first embodiment of an auto flow steam trap in accordance with the present invention.
Figure 2:
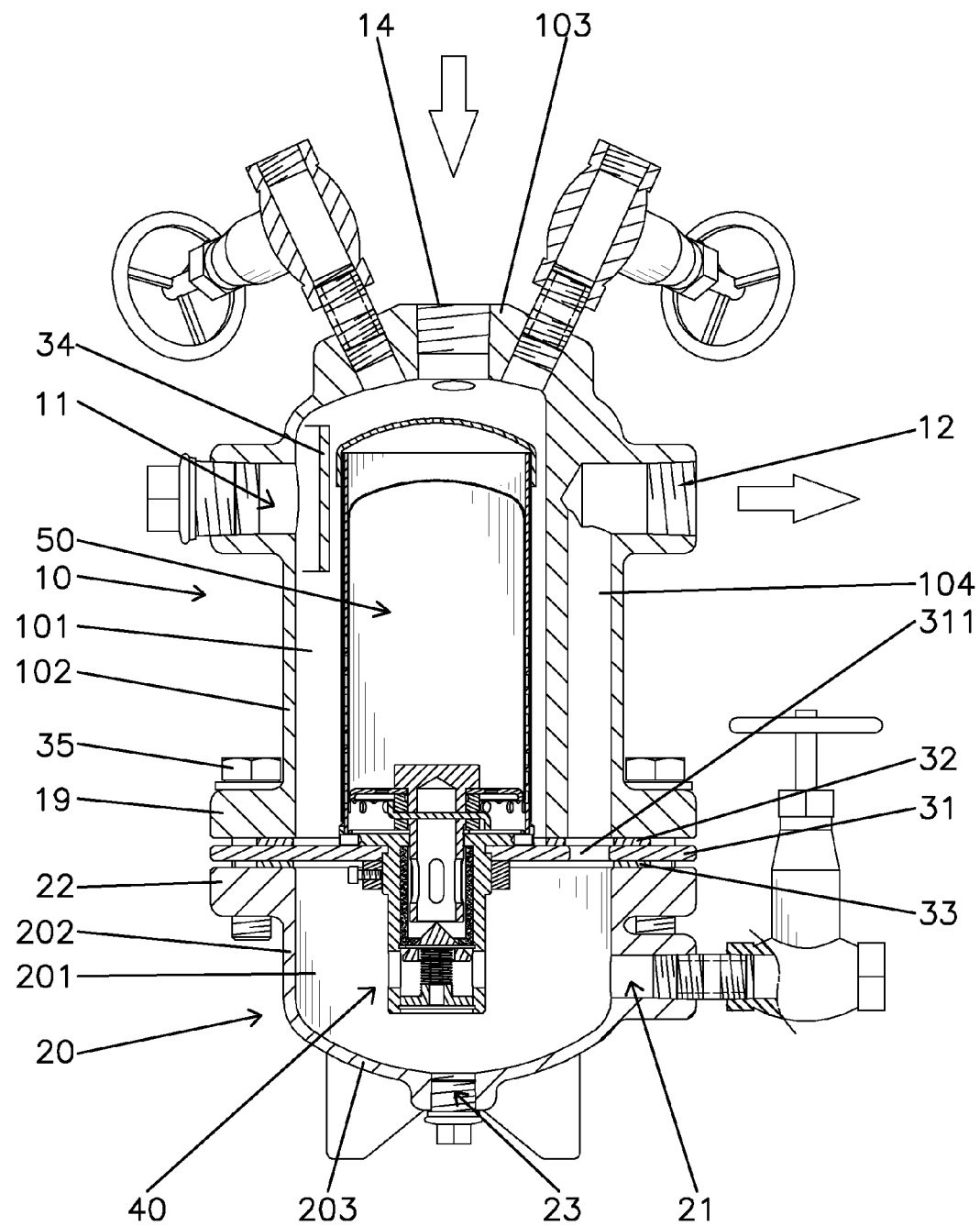
FIG. 2 is a side view in partial section of the steam trap in FIG. 1.

With reference to FIGS. 1 and 2, a first embodiment of an auto flow steam trap in accordance with the present invention comprises a hollow body A, at least one float seat 40 and at least one float assembly 50.

The body A has an upper casing 10, a lower casing 20, a partition panel 31, an upper chamber 101, a drain channel 104, a lower chamber 201, at least one condensate inlet 11, 14, a transverse outlet 12, a longitudinal outlet 23, an upper gasket 32, a lower gasket 33, at least one baffle 34, a manual drain port 13, a pressure balance port 15, a vacuum breaker port 16, an automatic pressurization port 17, an automatic pressure releasing port 18 and a high temperature condensate outlet 21.

The upper casing 10 has a peripheral wall 102, a top 103, a lower opening and an upper flange 19. The top 103 of the upper casing 10 is formed on an end of the peripheral wall 102 of the upper casing 10. The lower opening of the upper casing 10 is formed on the other end of the peripheral wall 102 of the upper casing 10. The upper flange 19 is formed on an outer surface of the peripheral wall 102 of the upper casing 10 and around the lower opening of the upper casing 10.

The lower casing 20 has a peripheral wall 202, a bottom 203, an upper opening and a lower flange 22. The bottom 203 of the lower casing 20 is formed on an end of the peripheral wall 202 of the lower casing 20. The upper opening of the lower casing 20 is formed on the other end of the peripheral wall 202 of the lower casing 20. The lower flange 22 is formed on an outer surface of the peripheral wall 202 of the lower casing 20 and around the upper opening of the lower casing 20, and corresponds to and is attached to the upper flange 19 of the upper casing 10.

The partition panel 31 is a disc, is securely mounted in the hollow body A, is mounted between and is held by the upper flange 19 of the upper casing 10 and the lower flange 22 of the lower casing 20 and has an upper surface, a lower surface, at least one through hole and a drain hole 311. The upper surface of the partition panel 31 corresponds to the upper casing 10. The lower surface of the partition panel 31 corresponds to the lower casing 20. The at least one through hole of the partition panel 31 and the drain hole 311 of the partition panel 31 are separately formed through the partition panel 31.

Preferably, multiple blots 35 are mounted through the upper flange 19 of the upper casing 10 and the partition panel 31, and are securely connected to the lower flange 22 of the lower casing 20 so the upper and lower casings 10, 20 are securely attached to each other.

The upper chamber 101 is defined above the upper surface of the partition panel 31 and is defined in the upper casing 10. The drain channel 104 is defined above the upper surface of the partition panel 31, is defined in the upper casing 10, is separated from the upper chamber 101, and corresponds to and communicates with the drain hole 311 of the partition panel 31. The lower chamber 201 is defined below the lower surface of the partition panel 31 and is defined in the lower casing 20.

The at least one condensate inlet 11, 14 is formed through the body A, is formed through the upper casing 10, communicates with the upper chamber 101 and is used for connecting the steam trap with a steam system. Preferably, the condensate inlet 11 may be transversely formed through the peripheral wall 102 of the upper casing 10. Preferably, the condensate inlet 14 may be longitudinally formed through the top 103 of the upper casing 10.

The transverse outlet 12 is formed through the body A, is formed through the peripheral wall 102 of the upper casing 10, communicates with the drain channel 104 and is used for connecting the steam trap with a water collecting tank. The longitudinal outlet 23 is formed through the body A, is formed through the bottom 203 of the lower casing 20 and communicates with the lower chamber 201.

The upper gasket 32 is annular, and is mounted between and held by the upper flange 19 of the upper casing 10 and the partition panel 31. The lower gasket 33 is annular, and is mounted between and held by the lower flange 22 of the lower casing 20 and the partition panel 31. The upper and lower gaskets 32, 33 prevent leakage from the upper chamber 101 and the lower chamber 201.

The at least one baffle 34 is disposed in the upper chamber 101 of the body A and is mounted on an inner surface of the upper casing 10 of the body A. Each of the at least one baffle 34 corresponds to and is separated from one of the at least one condensate inlet 11, 14 of the body A. Thus, the at least one baffle 34 prevents high temperature condensate that flows into the upper chamber 101 from the condensate inlet 11, 14 from damaging components inside the upper casing 10.

The manual drain port 13 is formed on the peripheral wall 102 of the upper casing 10 and communicates with the upper chamber 101. The pressure balance port 15, the vacuum breaker port 16, the automatic pressurization port 17 and the automatic pressure releasing port 18 are formed on the top 103 of the upper casing 10 and communicate with the upper chamber 101. The high temperature condensate outlet 21 is formed on the peripheral wall 202 of the lower casing 20 and communicates with the lower chamber 201.

Figure 3:
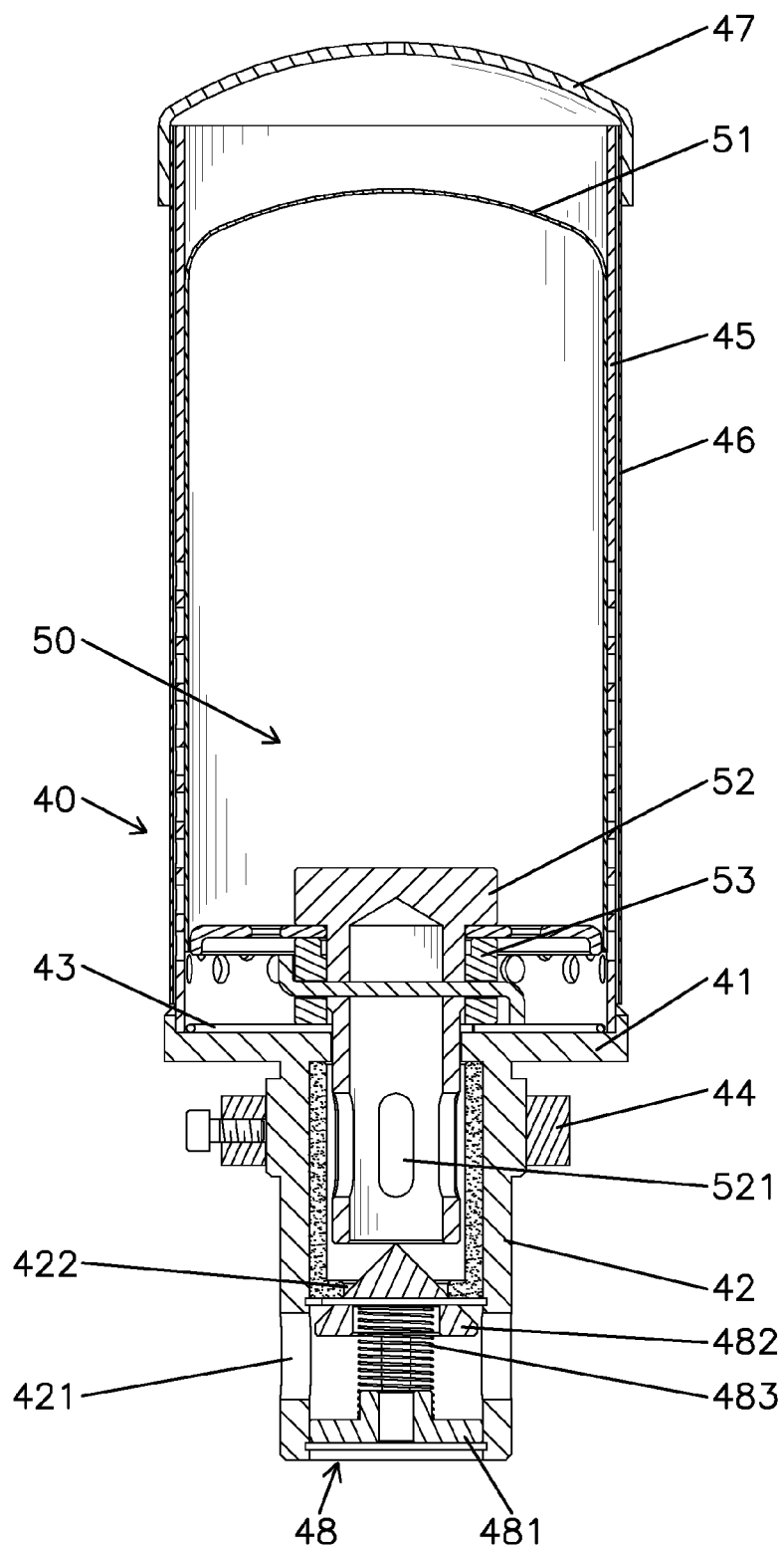
FIG. 3 is a side view in partial section of a float seat and a float assembly of the steam trap in FIG. 1.
Figure 4:
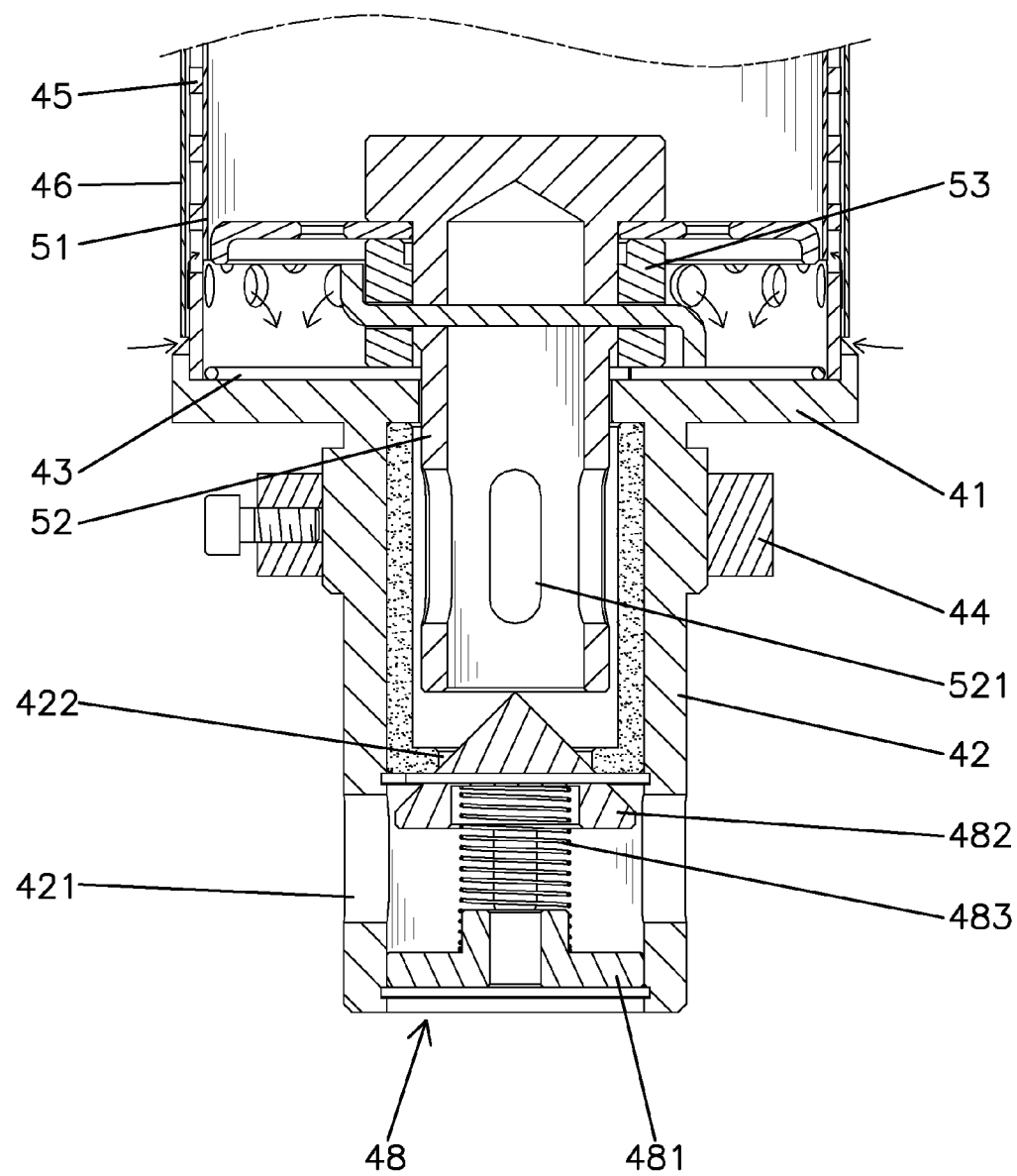
FIG. 4 is an enlarged side view in partial section of the float seat and the float assembly of the steam trap in FIG. 1.

With further reference to FIGS. 3 and 4, the at least one float seat 40 is mounted in the body A, on the partition panel 31 and through the at least one through hole of the partition panel 31. Each of the at least one float seat 40 has a mounting panel 41, a middle tube 42, a non-return valve assembly 48, a dividing ring 43, a holding ring 44, a tubular strainer 45, an outer tube 46, a clearance and a buffering cap 47.

The mounting panel 41 is mounted on the upper surface of the partition panel 31 and has an upper surface, a lower surface and a through hole. The lower surface of the mounting panel 41 corresponds to the upper surface of the partition panel 31. The through hole of the mounting panel 41 is formed through the mounting panel 41.

The middle tube 42 is formed on and protrudes down from the lower surface of the mounting panel 31, is formed around the through hole of the mounting panel 41, protrudes through a corresponding through hole of the partition panel 31 and into the lower chamber 201 of the body A, and has at least one flowing hole 421 and a valve hole 422. The at least one flowing hole 421 of the middle tube 42 is formed through the middle tube 42 and is disposed adjacent to a distal end of the middle tube 42. The valve hole 422 is formed in the middle tube 42, is disposed between the at least one flowing hole 421 of the middle tube 42 and the mounting panel 41, and has a diameter smaller than an inner diameter of the middle tube 42.

The non-return valve assembly 48 is mounted in the middle tube 42, is retractable and selectively seals the valve hole 422 of the middle tube 42. Each of the at least one float seat 40 has a stationary mount 481, a valve plug 482 and a resilient element 483. The stationary mount 481 is securely mounted in the middle tube 42 and is disposed at the distal end of the middle tube 42. The valve plug 482 is disposed between the stationary mount 481 and the valve hole 422 of the middle tube 42. The resilient element 483 has two ends respectively abutting the stationary mount 481 and the valve plug 482 to push the valve plug 482 to seal the valve hole 422 of the middle tube 42.

Figure 6:
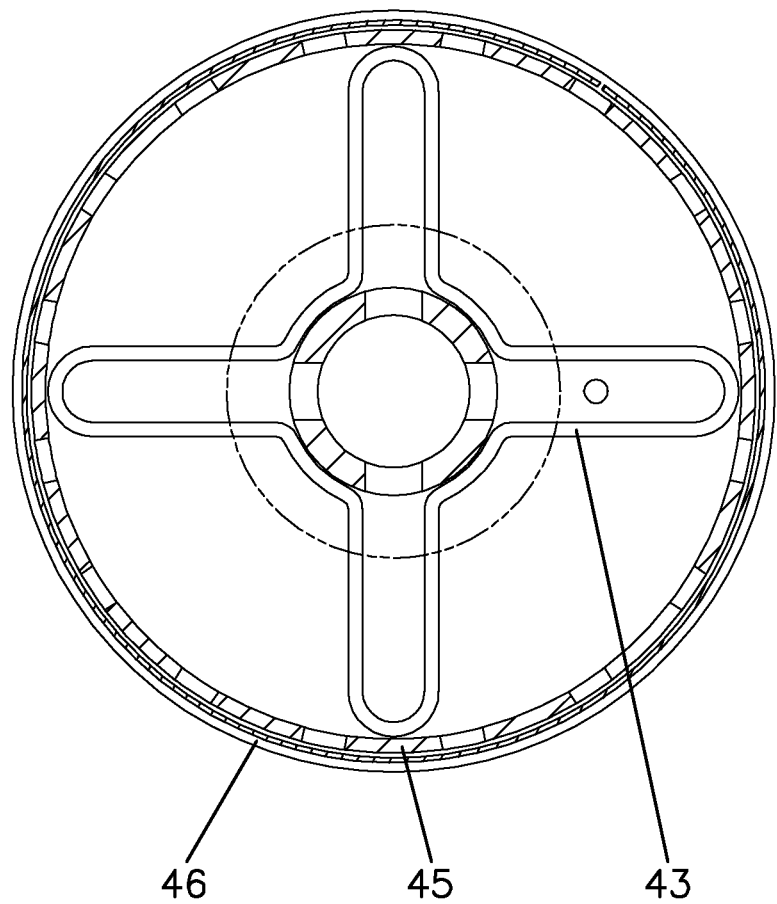
FIG. 6 is a cross-sectional end view of the float seat and the float assembly of the steam trap in FIG. 1.

With further reference to FIG. 6, the dividing ring 43 is curved and is mounted on the upper surface of the mounting panel 41.

The holding ring 44 is securely mounted around an outer surface of the middle tube 42 so the partition panel 31 is held between the mounting panel 41 and the holding ring 44.

The tubular strainer 45 is mounted on and around the upper surface of the mounting panel 41.

The outer tube 46 is mounted on the upper surface of the mounting panel 41 and around exterior of the tubular strainer 45.

The clearance is formed between a lower end edge of the outer tube 46 and the upper surface of the mounting panel 41 so fluid is able to flow through the clearance and the tubular strainer 45 and then flow into the tubular strainer 45.

The buffering cap 47 is mounted on a top end of the outer tube 46.

The at least one float assembly 50 is mounted in the at least one float seat 40. Each of the at least one float assembly 50 has a float 51, an adjusting tube 52 and a mounting ring 53.

The float 51 is movably mounted in the tubular strainer 45 and may be elongated and have a width corresponding to an internal diameter of the tubular strainer 45 so the float 51 moves up and down along the tubular strainer 45 without colliding with the tubular strainer 45.

The adjusting tube 52 is securely mounted on and protrudes down from a bottom of the float 51, is slidably mounted through the through hole of the mounting panel 41 of a corresponding float seat 40, protrudes into the middle tube 42 of the corresponding float seat 40 and has at least one flowing hole 521 formed through the adjusting tube 52.

The mounting ring 53 is mounted around an outer surface of the adjusting tube 52, selectively abuts the dividing ring 43 of the corresponding float seat 40 to divide the float 51 from the mounting panel 41 of the corresponding float seat 40.

Figure 8:
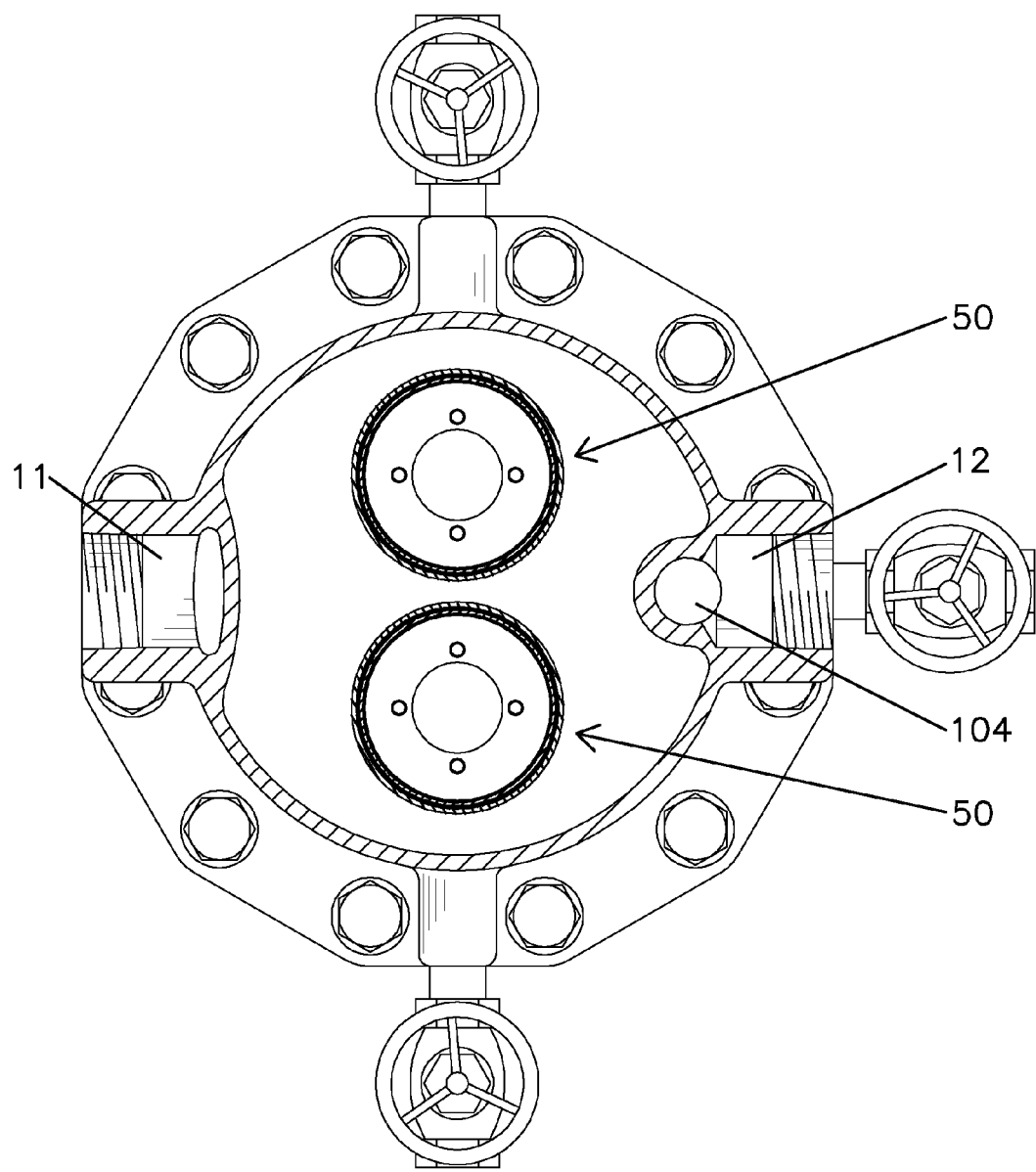
FIG. 8 is a cross-sectional top view of a second embodiment of an auto flow steam trap in accordance with the present invention.
Figure 9:
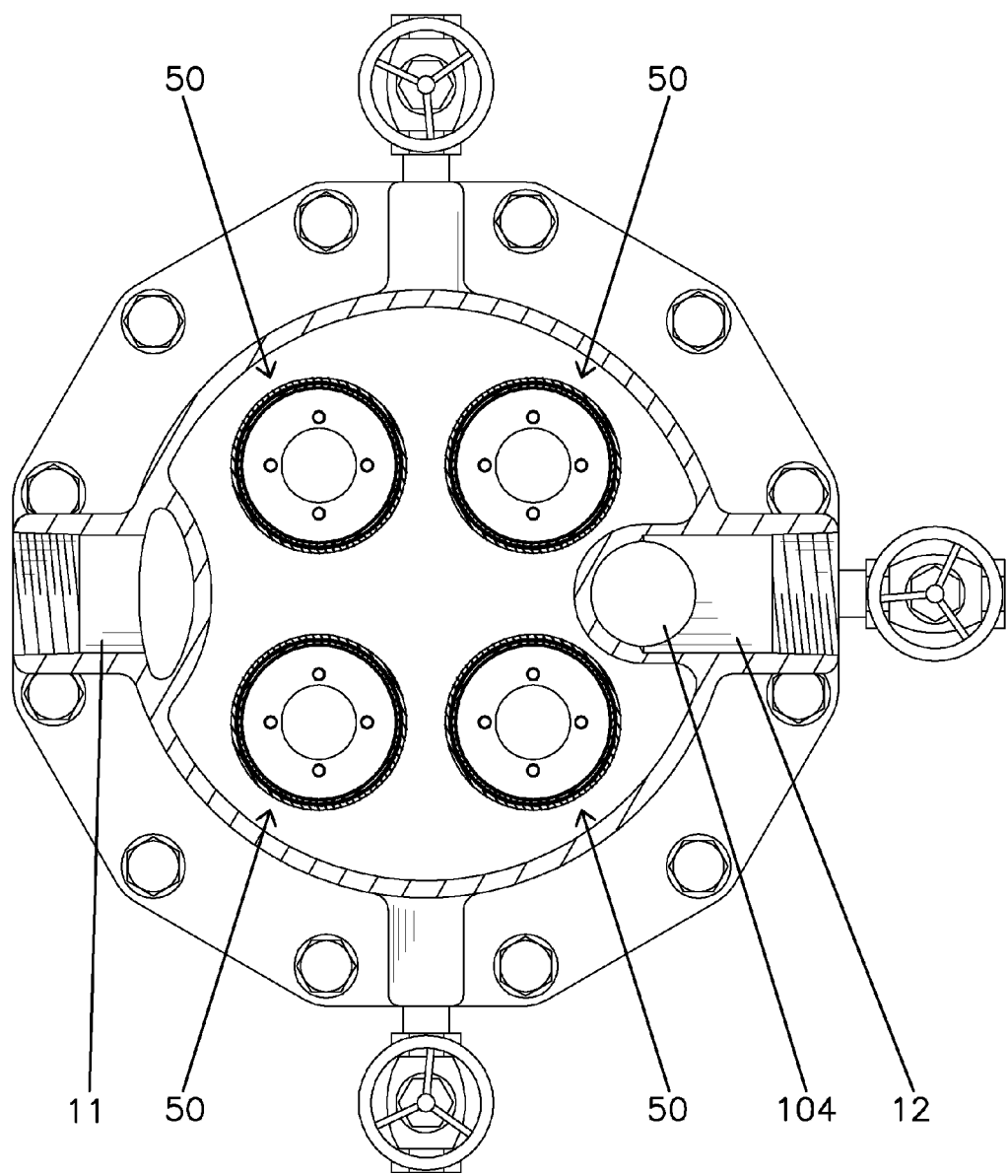
FIG. 9 is a cross-sectional top view of a third embodiment of an auto flow steam trap in accordance with the present invention.
Figure 10:
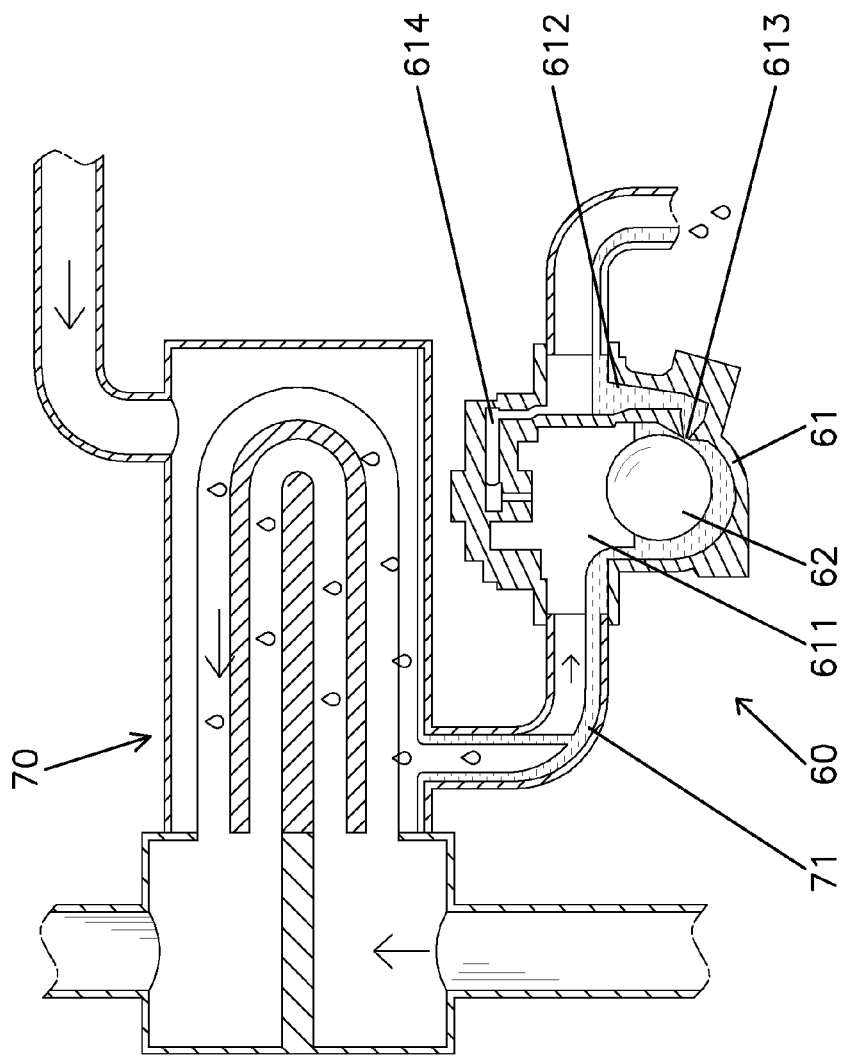
FIG. 10 is a side view in partial section of a conventional steam trap in accordance with the prior art.

With further reference to FIG. 8, in a second embodiment of an auto flow steam trap in accordance with the present invention, two float seats 40 are mounted in the body A and two float assemblies 50 are respectively mounted in the float seats 40. With further reference to FIG. 9, in a third embodiment of an auto flow steam trap in accordance with the present invention, four float seats 40 are mounted in the body A and four float assemblies 50 are respectively mounted in the float seats 40. The auto flow steam traps that have different numbers of the float seats 40 and the float assemblies 50 are used for steam systems of different scales.

Figure 7:
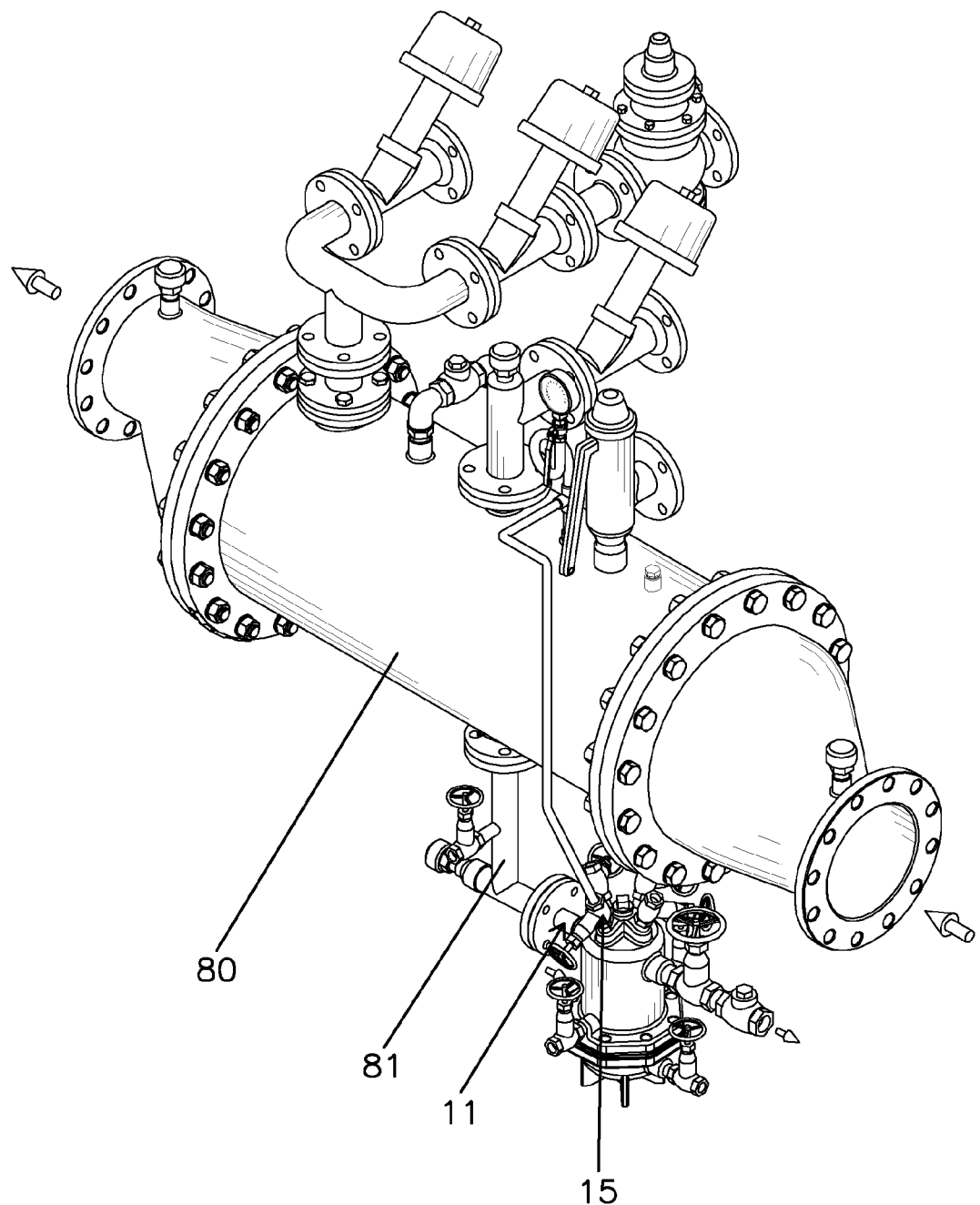
FIG. 7 is an operational perspective view of the steam trap in FIG. 1, showing the steam trap connecting to a shell-and-tube heat exchanger.

With further reference to FIG. 7, a shell-and-tube heat exchanger 80 is connected to the condensate inlet 11 and the pressure balance port 15 of the body A of the steam trap.

With further reference to FIGS. 2 and 3, condensate formed in the shell-and-tube heat exchanger 80 flows into the steam trap through the condensate inlet 11, 14 and is accumulated in the upper chamber 101. As the condensate accumulated in the upper chamber 101 of the upper casing 10 increases, the condensate flows through the clearance formed between the lower end edge of the outer tube 46 and the mounting panel 41 and the tubular strainer 45, and then flows into the tubular strainer 45.

In addition, the baffle 34 in the upper casing 10 and the buffering cap 47 on the top end of the outer tube 46 buffer the high temperature condensate that flows into the body A through the condensate inlet 11, 14 and prevent the high temperature condensate from damaging components inside the body A.

Figure 5:
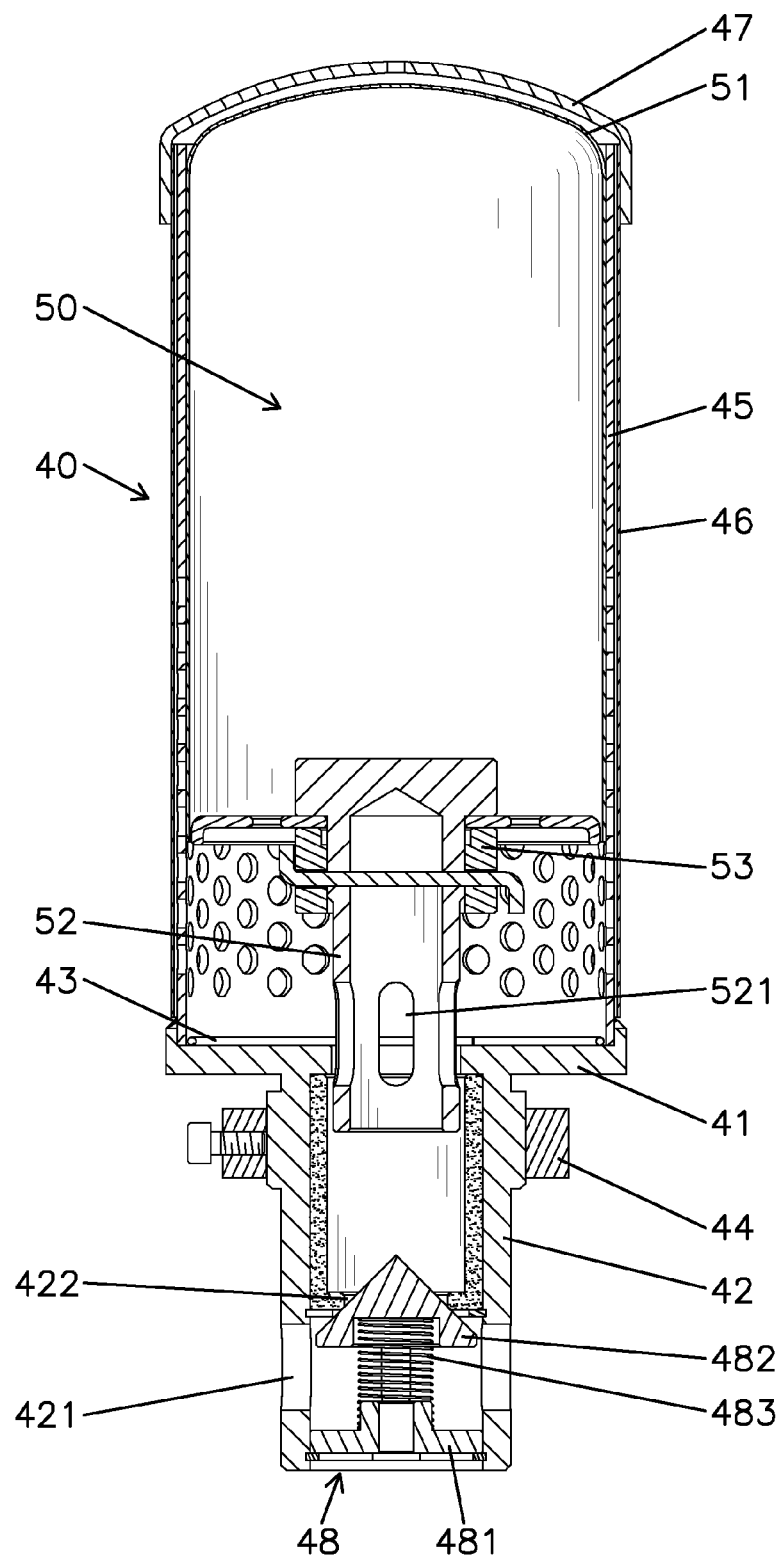
FIG. 5 is an operational side view in partial section of the float seat and the float assembly of the steam trap in FIG. 1.

With further reference to FIG. 5, as the condensate accumulated in the tubular strainer 45 increases, the float 51 is raised and the adjusting tube 52 moves up accordingly. When the at least one flowing hole 521 of the adjusting tube 52 corresponds to the upper chamber 101 of the upper casing 10, the condensate in the tubular strainer 45 further flows through the at least one flowing hole 521 of the adjusting tube 52 and into the middle tube 42, pushes the valve plug 482, presses the resilient element 483 of the non-return valve assembly 48, and then flows into and is accumulated in the lower chamber 201 of the lower casing 20. The higher the float 51 is raised, the larger the area of the at least one flowing hole 521 of the adjusting tube 52 that corresponds to the upper chamber 101 of the upper casing 10, and the more the condensate that flows through the at least one flowing hole 521 of the adjusting tube 52 and into the lower chamber 201 of the lower casing 20. Furthermore, the non-return valve assembly 48 also buffers flow of the condensate.

With further reference to FIG. 2, then the condensate in the lower chamber 201 of the lower casing 20 flows through the drain hole 311 of the partition panel 31, the drain channel 104 of the upper casing 10 and the transverse outlet 12, and drains into the water collecting tank.

The condensate in the lower chamber 201 of the lower casing 20 may also be drained directly through the longitudinal outlet 23 of the lower casing 20.

In addition, when no condensate flows through the at least one float seat 40 and the at least one float assembly 50 and into the lower chamber 201 of the lower casing 20, the resilient element 483 of the non-return valve assembly 48 pushes the valve plug 482 to seal the valve hole 422 of the middle tube 42. Therefore, the condensate and steam that have flowed out of the steam trap do not flow back into the steam trap so the float 51 is not damaged.

Moreover, besides guiding movements of the float 51, the tubular strainer 45 and outer tube 46 of the at least one float seat 40 also filter particles in the condensate to prevent the particles from damaging the float 51. As there are more and more particles accumulating in the upper chamber 101, the manual drain port 13 can be opened to drain out the condensate along with the particles in the upper chamber 101.

The auto flow steam trap as described may be used in a steam system that heats fluid with steam or cools the fluid with cool water under moderate temperature (below 300° C.) and moderate pressure (below 12 kg/cm$^2$). The steam system may be a heat exchanger on a dipping equipment such as dyeing machine for textile products. The auto flow steam trap may also be used on a steam pipeline to remove the condensate in the steam pipeline. The auto flow steam trap has the following advantages.

The pressure balance port 15 that is connected to the steam system allows the steam trap and the shell-and-tube heat exchanger 80 to have balanced pressures. Thus, pipelines that connect the steam trap to the shell-and-tube heat exchanger 80 are not choked.

The high temperature condensate outlet 21 of the lower casing 20 may also be connected to the steam system so the condensate in the lower chamber 201 of the lower casing 20 flows back to the steam system. Thus, heat energy of the high temperature condensate is recycled, reused and not wasted.

Since adhesion forces occur between liquid and solid, the dividing ring 43 that divides the mounting ring 53 of the float assembly 50 from the upper surface of the partition panel 31 prevents the mounting ring 53 from sticking to the condensate on the partition panel 31. Therefore, the float 51 is able to move smoothly.

Furthermore, while the condensate is accumulated in the body A, the temperature of the condensate lowers. Consequently, no flash steam occurs when the condensate is drained out of the steam trap.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An auto flow steam trap comprising
a hollow body having
    a partition panel securely mounted in the hollow body and having
      at least one through hole formed through the partition panel; and
      a drain hole formed through the partition panel and separated from the at least one through hole of the partition panel;
    an upper chamber defined above an upper surface of the partition panel;
    a drain channel defined above the upper surface of the partition panel, separated from the upper chamber, and corresponding to and communicating with the drain hole of the partition panel;
    a lower chamber defined below a lower surface of the partition panel;

at least one condensate inlet formed through the body and communicating with the upper chamber; and a transverse outlet formed through the body and communicating with the drain channel;

at least one float seat mounted in the body on the partition panel and through the at least one through hole of the partition panel, and each of the at least one float seat having a mounting panel mounted on the upper surface of the partition panel and having a through hole formed through the mounting panel;

a middle tube formed on and protruding down from a lower surface of the mounting panel, formed around the through hole of the mounting panel, protruding through a corresponding through hole of the partition panel and into the lower chamber of the body, and having at least one flowing hole formed through the middle tube and disposed adjacent to a distal end of the middle tube;

a tubular strainer mounted on and around an upper surface of the mounting panel;

an outer tube mounted on the upper surface of the mounting panel and around exterior of the tubular strainer; and a clearance formed between a lower end edge of the outer tube and the upper surface of the mounting panel; and at least one float assembly mounted in the at least one float seat, and each of the at least one float assembly having a float movably mounted in the tubular strainer; and an adjusting tube securely mounted on and protruding down from a bottom of the float, slidably mounted through the through hole of the mounting panel of a corresponding float seat, protruding into the middle tube of the corresponding float seat and having at least one flowing hole formed through the adjusting tube.

2. The auto flow steam trap as claimed in claim 1, wherein the body has an upper casing having a peripheral wall, a top, a lower opening and an upper flange formed on an outer surface of the peripheral wall of the upper casing and around the lower opening of the upper casing; and a lower casing having a peripheral wall, a bottom, an upper opening and a lower flange formed on an outer surface of the peripheral wall of the lower casing and around the upper opening of the lower casing, and corresponding to and attached to the upper flange of the upper casing;

the partition panel is mounted between and is held by the upper flange of the upper casing and the lower flange of the lower casing;

the upper chamber and the drain channel of the body are defined in the upper casing;

the condensate inlet and the transverse outlet of the body are formed through the upper casing; and the lower chamber of the body is defined in the lower casing.

3. The auto flow steam trap as claimed in claim 2, wherein each of the at least one float seat further has a dividing ring being curved and mounted on the upper surface of the mounting panel of the float seat; and each of the at least one float assembly further has a mounting ring mounted around an outer surface of the adjusting tube, selectively abutting the dividing ring of the corresponding float seat.

4. The auto flow steam trap as claimed in claim 1, wherein the middle tube of each of the at least one float seat further has a valve hole formed in the middle tube, disposed between the at least one flowing hole of the middle tube and the mounting panel, and having a diameter smaller than an inner diameter of the middle tube; and each of the at least one float seat further has a non-return valve assembly mounted in the middle tube, being retractable and selectively sealing the valve hole of the middle tube.

5. The auto flow steam trap as claimed in claim 4, wherein the body has an upper casing having a peripheral wall, a top, a lower opening and an upper flange formed on an outer surface of the peripheral wall of the upper casing and around the lower opening of the upper casing; and a lower casing having a peripheral wall, a bottom, an upper opening and a lower flange formed on an outer surface of the peripheral wall of the lower casing and around the upper opening of the lower casing, and corresponding to and attached to the upper flange of the upper casing;

the partition panel is mounted between and is held by the upper flange of the upper casing and the lower flange of the lower casing;

the upper chamber and the drain channel of the body are defined in the upper casing;

the condensate inlet and the transverse outlet of the body are formed through the upper casing; and the lower chamber of the body is defined in the lower casing.

6. The auto flow steam trap as claimed in claim 5, wherein each of the at least one float seat further has a dividing ring being curved and mounted on the upper surface of the mounting panel of the float seat; and each of the at least one float assembly further has a mounting ring mounted around an outer surface of the adjusting tube, selectively abutting the dividing ring of the corresponding float seat.

7. The auto flow steam trap as claimed in claim 4, wherein the non-return valve assembly of each of the at least one float seat has a stationary mount securely mounted in the middle tube and disposed at the distal end of the middle tube;

a valve plug disposed between the stationary mount and the valve hole of the middle tube; and a resilient element having two ends respectively abutting the stationary mount and the valve plug.

8. The auto flow steam trap as claimed in claim 7, wherein the body has an upper casing having a peripheral wall, a top, a lower opening and an upper flange formed on an outer surface of the peripheral wall of the upper casing and around the lower opening of the upper casing; and a lower casing having a peripheral wall, a bottom, an upper opening and a lower flange formed on an outer surface of the peripheral wall of the lower casing and around the upper opening of the lower casing, and corresponding to and attached to the upper flange of the upper casing;

the partition panel is mounted between and is held by the upper flange of the upper casing and the lower flange of the lower casing;

the upper chamber and the drain channel of the body are defined in the upper casing;

the condensate inlet and the transverse outlet of the body are formed through the upper casing; and the lower chamber of the body is defined in the lower casing.

9. The auto flow steam trap as claimed in claim 8, wherein
each of the at least one float seat further has a dividing ring being curved and mounted on the upper surface of the mounting panel of the float seat; and
each of the at least one float assembly further has a mounting ring mounted around an outer surface of the adjusting tube, selectively abutting the dividing ring of the corresponding float seat.

10. The auto flow steam trap as claimed in claim 9, wherein the body further has
an upper gasket being annular, and mounted between and held by the upper flange of the upper casing and the partition panel; and
a lower gasket being annular, and mounted between and held by the lower flange of the lower casing and the partition panel.

11. The auto flow steam trap as claimed in claim 10, wherein
each of the at least one float seat further has a holding ring securely mounted around an outer surface of the middle tube; and
the partition panel is held between the mounting panel and the holding ring.

12. The auto flow steam trap as claimed in claim 7, wherein the body further has at least one baffle disposed in the upper chamber of the body and mounted on an inner surface of the body, and each of the at least one baffle corresponds to and is separated from one of the at least one condensate inlet of the body.

13. The auto flow steam trap as claimed in claim 12, wherein
the body has
an upper casing having a peripheral wall, a top, a lower opening and an upper flange formed on an outer surface of the peripheral wall of the upper casing and around the lower opening of the upper casing; and
a lower casing having a peripheral wall, a bottom, an upper opening and a lower flange formed on an outer surface of the peripheral wall of the lower casing and around the upper opening of the lower casing, and corresponding to and attached to the upper flange of the upper casing;
the partition panel is mounted between and is held by the upper flange of the upper casing and the lower flange of the lower casing;
the upper chamber and the drain channel of the body are defined in the upper casing;
the condensate inlet and the transverse outlet of the body are formed through the upper casing; and
the lower chamber of the body is defined in the lower casing.

14. The auto flow steam trap as claimed in claim 13, wherein
each of the at least one float seat further has a dividing ring being curved and mounted on the upper surface of the mounting panel of the float seat; and
each of the at least one float assembly further has a mounting ring mounted around an outer surface of the adjusting tube, selectively abutting the dividing ring of the corresponding float seat.

15. The auto flow steam trap as claimed in claim 14, wherein the body further has
an upper gasket being annular, and mounted between and held by the upper flange of the upper casing and the partition panel; and
a lower gasket being annular, and mounted between and held by the lower flange of the lower casing and the partition panel.

16. The auto flow steam trap as claimed in claim 15, wherein
each of the at least one float seat further has a holding ring securely mounted around an outer surface of the middle tube; and
the partition panel is held between the mounting panel and the holding ring.

17. The auto flow steam trap as claimed in claim 16, wherein
the condensate inlet of the body is transversely formed through the peripheral wall of the upper casing; and
the body further has a longitudinal outlet formed through the bottom of the lower casing and communicating with the lower chamber.

18. The auto flow steam trap as claimed in claim 16, wherein
the condensate inlet of the body is formed through the top of the upper casing; and
the body further has a longitudinal outlet formed through the bottom of the lower casing and communicating with the lower chamber.

19. The auto flow steam trap as claimed in claim 17, wherein the body further has
a manual drain port formed on the peripheral wall of the upper casing and communicating with the upper chamber;
a pressure balance port, a vacuum breaker port, an automatic pressurization port and an automatic pressure releasing port formed on the top of the upper casing and communicating with the upper chamber; and
a high temperature condensate outlet formed on the peripheral wall of the lower casing and communicating with the lower chamber.

20. The auto flow steam trap as claimed in claim 18, wherein the body further has
a manual drain port formed on the peripheral wall of the upper casing and communicating with the upper chamber;
a pressure balance port, a vacuum breaker port, an automatic pressurization port and an automatic pressure releasing port formed on the top of the upper casing and communicating with the upper chamber; and
a high temperature condensate outlet formed on the peripheral wall of the lower casing and communicating with the lower chamber.

* * * * *